United States Patent [19]
Scheibenpflug

[11] 4,437,638
[45] Mar. 20, 1984

[54] ARRANGEMENT FOR FASTENING A MONITOR TO A TEXT STATION

[75] Inventor: Konrad Scheibenpflug, Germering, Fed. Rep. of Germany

[73] Assignee: Siemens Aktiengesellschaft, Berlin & Munich, Fed. Rep. of Germany

[21] Appl. No.: 248,242

[22] Filed: Mar. 27, 1981

[30] Foreign Application Priority Data

Apr. 15, 1980 [DE] Fed. Rep. of Germany ....... 3014478

[51] Int. Cl.³ .............................................. B01D 27/02
[52] U.S. Cl. ..................................... 248/282; 248/183
[58] Field of Search .................. 248/282, 183; 108/92; 297/240, 241, 242

[56] References Cited

U.S. PATENT DOCUMENTS

| D. 253,594 | 12/1979 | Atenbring | D14/40 |
|---|---|---|---|
| 376,617 | 1/1888 | Vance | 248/282 X |
| 2,048,313 | 7/1936 | Adolfson | 248/282 X |
| 2,653,330 | 9/1953 | Nolan | 248/282 X |
| 3,245,283 | 4/1966 | Van Noord | 248/282 X |
| 3,970,792 | 7/1976 | Benham et al. | 248/183 X |
| 4,225,106 | 9/1980 | Eplan | 248/282 X |
| 4,310,136 | 1/1982 | Mooney | 248/183 X |

FOREIGN PATENT DOCUMENTS 836408  1/1939  France ................... 297/241

Primary Examiner—Ramon S. Britts
Assistant Examiner—Sarah A. Lechok
Attorney, Agent, or Firm—Hill, Van Santen, Steadman & Simpson

[57] ABSTRACT

A screen monitor, such as for test editing, is disposed for swivelable and inclinable movement to one side of a text station machine, such as a word processor or telex, on an upstanding support column. An extension arm crank is connected at one end with the top of the support column and supports the screen monitor on its other end. The extension arm is swivelably arranged on a bushing connector at the top of the column. The monitor is similarly swivelably arranged on a bushing connection at the free end of the extension arm. The monitor is further supported for rotatably inclinable movement by means of angle bracket mountings which are pinned in tight-fit relation on a shaft running through the monitor bushing.

8 Claims, 6 Drawing Figures

U.S. Patent    Mar. 20, 1984    Sheet 3 of 3    4,437,638

ARRANGEMENT FOR FASTENING A MONITOR TO A TEXT STATION

BACKGROUND OF THE INVENTION

The invention relates to an arrangement for fastening a text monitor to a word processing station and, more particularly, to a fastening arrangement which permits the monitor to be positioned on a column to one side of the station and swivelable on the column.

It is already known to provide screen monitor devices, on which text can be displayed before having the stored text information fed to a printing unit, in connection with word processing stations or machines for text editing. An expected design would be to dispose such a monitor directly above the printing unit of the station; however, it becomes necessary to take precautions so that paper being printed does not cover the viewing screen of the monitor. Adjustment of the screen monitor at the text station has heretofore required cumbersome and complicated equipment.

An object of the present invention is to provide an arrangement for fastening a screen monitor to a text station which utilizes uncomplicated structure and is readily adjustable so that the monitor can be optimally positioned by the operator.

SUMMARY OF THE INVENTION

A column is mounted to one side of a word processing or text station. The column has an extension arm crank located at its upper end which is rotatable in a plane perpendicular to the column. A screen monitor for text editing is rotatably secured at the free end of the arm member. As a result of the swivelability of the extension arm on the column and of the rotatability of the monitor on the extension arm, the monitor can be arranged in many different positions. The extension arm permits the distance between the operator and the picture screen to be changed and does not interfere with the operator's observation of paper discharged by the printing unit. Light reflection resulting in mirror images on the monitor screen can be avoided due to the relative swivelability and rotatability of the monitor. An additional setting possibility for the position of the monitor is achieved in that the monitor is disposed on the extension arm in such manner as to be rotatably inclinable.

The column is secured on a bottom trough away from one side of the text station. The column may be disposed to the left or to the right of the text station. The swivelable fastening of the extension arm to the column is achieved by a bushing disosed at the top of the column and a connector portion forming the lower part of the extension arm which is swivelably secured to the bush by means of a pin and a shoulder screw arrangement. A tight fit seating is afforded for the connector portion by means of a leaf spring disposed between the shoulder screw and a corresponding wall surface on the connector portion. The monitor is swivelably arranged at the free end of the extension arm by a similar bush and pin and screw arrangement. Since the two bush arrangements are identically designed, construction costs for the inventive device are minimized. The monitor is inclinably arranged at the second bush by being mounted on angle brackets which are supported in tight-fit, swivelable relation on the shaft. An electrical connection cable to the monitor is conducted through the bushes, the extension arm, and the column from the text station.

DESCRIPTION OF THE PREFERRED EMBODIMENT

Figure 1:
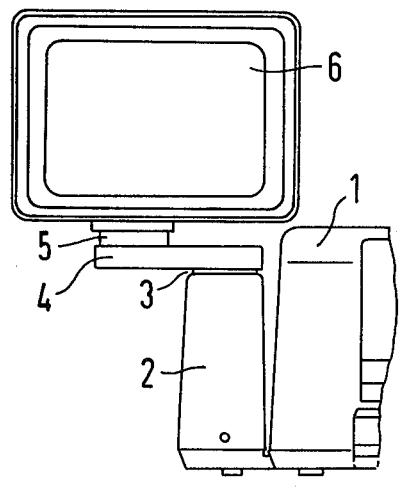
FIG. 1 is a fragmentary, front elevational view of a text station machine having a screen monitor supported for swivelable movement on a column to one side of the station in accordance with the present invention.
Figure 2:
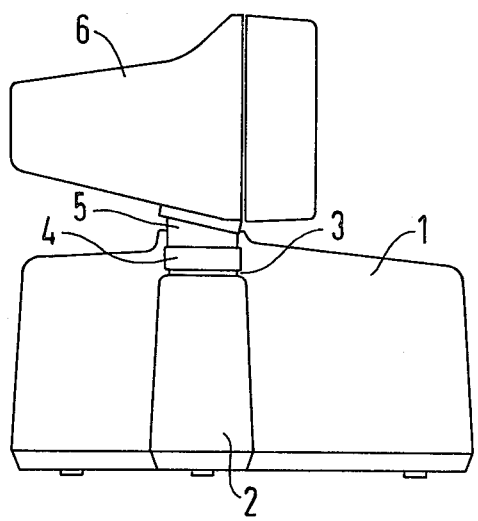
FIG. 2 is a side elevational view of the assembly of FIG. 1.

FIGS. 1 and 2 illustrate a text station 1 having an upstanding column 2 mounted to one side of the text station upon a base plate or trough which extends laterally from the base housing of the text machine 1. The text station 1 generally contains a keyboard and a printing unit and is designed for text editing, word processing, and/or text transmission, such as a telex machine.

An extension arm crank 4 is disposed for swivelable movement in a plane perpendicular to the longitudinal axis of the support column 2 on a bushing member 3. At the free end of the extension arm 4, there is mounted a further bushing member 5 on which a screen monitor 6, such as may be used by an operator for text editing, disposed for swivelable and rotatably inclinable movement. The text station keyboard is preferably positioned such that the keyboard is in front of the text station in a position generally parallel to the picture screen of the monitor 6.

Figure 3:
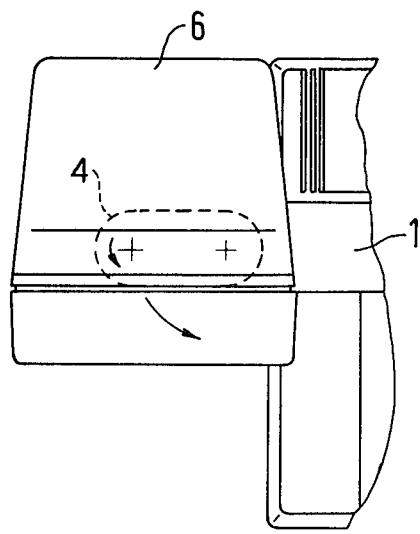
FIG. 3 is a fragmentary plan view of the assembly of FIG. 1.

FIG. 3 indicates by means of arrows the capability of the screen monitor 6 to be swivelable in the incline direction relative to the extension arm 4.

Figure 4:
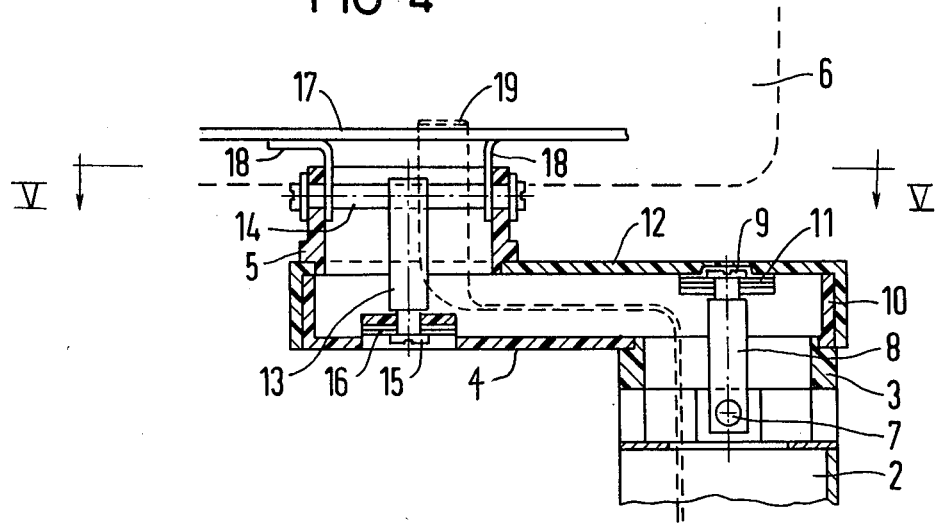
FIG. 4 is a fragmentary cross-sectional side elevational view of the extension arm arrangement for the monitor mounting in FIG. 1.
Figure 5:
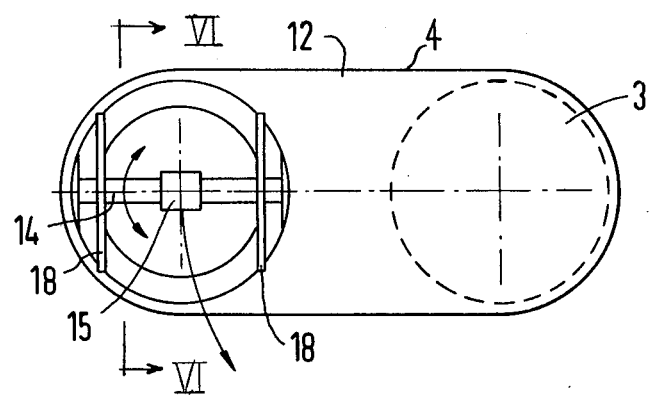
FIG. 5 is a cross-sectional view taken along the lines V—V of FIG. 4.
Figure 6:
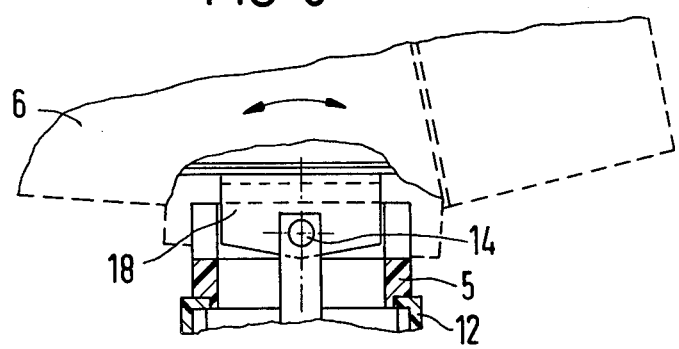
FIG. 6 is a fragmentary, cross-sectional side elevational view taken along the lines VI—VI of FIG. 5.
Figure 4:
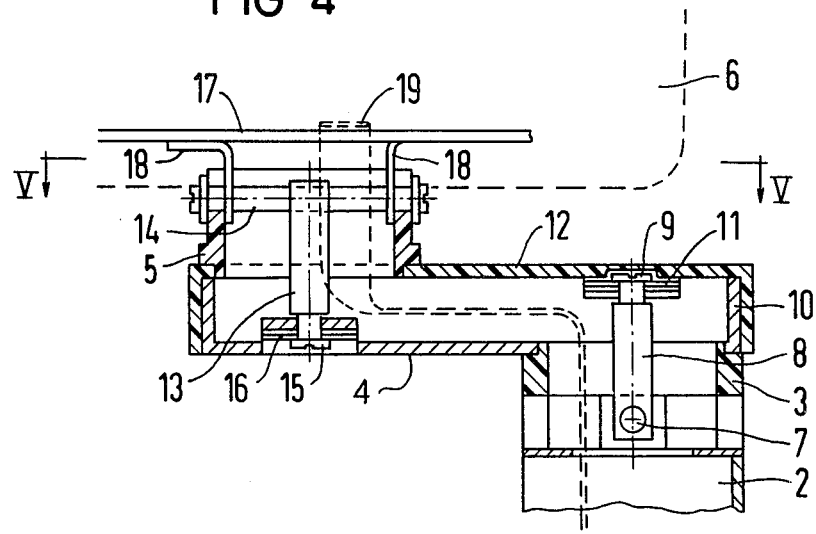
Figure 5:
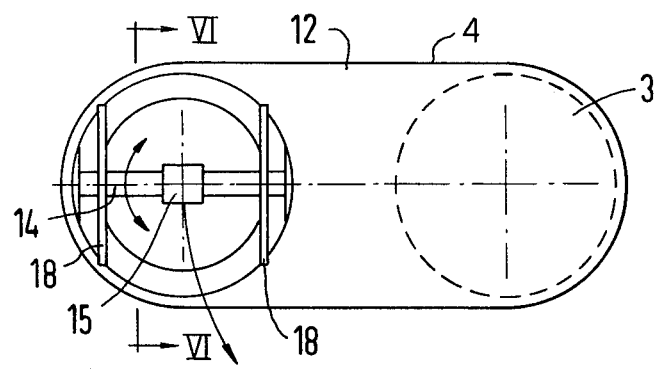
Figure 6:
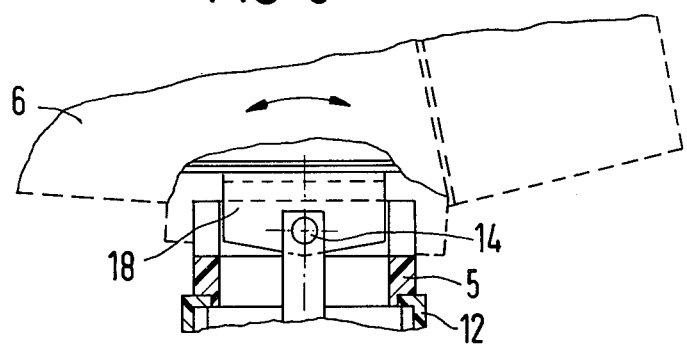

FIGS. 4–6 illustrate the swivelable mounting assembly for the text monitor 6 relative to the support column 2. The bushing 3 is fixably positioned at the top of the column 2 by means of a pin shaft 7 running through corresponding connecting wall surfaces of the bush 3 and the column. The lower part of one end of the extension arm 4 is formed with a surface connector portion 10, preferably made of aluminum die casting, which is fastened to the bush 3 by means of a pin 8 extending upward from the shaft 7 and a shoulder screw 9 which is threadably received in the pin and serves to hold the inner end of the extension arm 4 against the bush 3. A swivelable, but tight-fit, connection is afforded between the inner end of the extension arm 4 and the bush 3 by means of a leaf spring 11 which resiliently maintains the surface portion 10 against the bush 3.

A synthetic material covering 12, such as plastic, is disposed over the wall surfaces of the extension arm 4, including the surface portion 10, to provide an exterior smooth surface for the extension arm member.

The second bushing member 5 is disposed at the free end of the extension arm 4 is preferably constructed substantially identical to the bushing 3, thus reducing overall construction cost for the inventive monitor mounting arrangement. The bushing 5 has a lower end which is received in seating connection in a corresponding opening formed in the extension arm covering surface 12. A shaft 14 is positioned through the bushing 5 by attachment means, such as bolts. The shaft 14 supports one end of a vertically extending pin 13. The other end of the pin 13 receives a shoulder screw 15 threadably therein for attaching the bushing 5 to the free end of the extension arm 4. A leaf spring 16, interposed between the head of the shoulder screw 15 and a corresponding clamp surface on the extension arm 4, serves to maintain the bushing 5 in a tight-fit, but swivelable, relation on the extension arm.

Two bracket angles 18 are provided with corresponding bores at their lower ends for mounting on the shaft 14 in a swivelable, but tight-fit reltion. The upper ends of the bracket angles 18 support a laterally extending mounting plate 17 upon which the screen monitor 6 is secured.

An electrical connection cable 19 runs from the text station 1 through the support column 2, the bushings 3 and 5, and the extension arm 4 to the monitor 6.

The pin 8 and shoulder screw 9 connection for the extension arm 4 to the first bushing 3 enabled the extension arm and monitor 6 to be swiveled in a plane perpendicular to the longitudinal axis of the support column 2. As indicated by the arrows in FIG. 5, the pin 13 and shoulder screw 15 arrangement along with the bushing shaft 14 permit the bushing 5 and monitor 6 to be swivelable laterally relative to the free end of the extension arm 4. The arrows in FIG. 6 indicate the rotatable movement afforded by the bracket angle 18 tight-fit connection onto the bushing shaft 14 such that the monitor 6 may be rotatably inclined relative to the free end of the extension arm 4. Thus, in accordance with the invention, a screen monitor 6 is disposed away from the printing unit of text station 1 and is adjustable to many different positions for easy observation by the operator and to avoid glare or mere imaging in the picture screen of the monitor 6.

Although various minor modifications may be suggested by those versed in the art, it should be understood that I wish to embody within the scope of the patent warranted hereon all such modifications as reasonably and properly come within the scope of my contribution to the art.

We claim as our invention:

1. Apparatus for fastening a screen monitor to a text printing machine having a housing, comprising an upright column positioned to one side of said machine housing, an extension arm extending laterally outward from the longitudinal axis of said column, a first bushing connecting means between one end of said extension arm and an upper end of said column such that said extension arm is swivelably disposed relative to said column, a second bushing connection means between the other end of said extension arm and said screen monitor such that said screen is mounted for swivelable movement relative to said extension arm other end, wherein said first bushing means comprises a bush disposed on said column, a pin shaft extending through said bush and securing said bush to said column, a pin connected at one end to said pin shaft and extending upward therefrom, a connector surface portion formed on said extension arm disposed over said bush, and a shoulder screw for clamping said connector surface portion onto said bush and being threadably received in an upper end of said pin.

2. The apparatus of claim 1, wherein said first bushing means further comprises a leaf spring between said shoulder screw and said connector surface portion.

3. The apparatus of claim 1, wherein said second bushing means comprises a second bush disposed on said other end of said extension arm, a shaft extending through said second bush, a second pin connected at one end to said shaft and extending downwardly therefrom, a surface portion formed on said extension arm disposed beneath said bush, and a second shoulder screw for clamping said surface portion against said bush and being threadably received in a lower end of said second pin.

4. The apparatus of claim 3, wherein said second bushing means further comprises a second leaf spring between said second shoulder screw and said surface portion.

5. Apparatus for fastening a screen monitor to a text printing machine having a housing, comprising an upright column positioned to one side of said machine housing, an extension arm extending laterally outward from the longitudinal axis of said column, a first bushing connecting means between one end of said extension arm and an upper end of said column such that said extension arm is swivelably disposed relative to said column, a second bushing connection means between the other end of said extension arm and said screen monitor such that said screen monitor is mounted for swivelable movement relative to said extension arm other end, wherein said second bushing means comprises a bush disposed on said other end of said extension arm, a shaft extending through said bush, a pin connected at one end to said shaft and extending downwardly therefrom, a surface portion formed on said extension arm disposed beneath said bush, and a shoulder screw for clamping said surface portion against said bush and being threadably received in a lower end of said pin.

6. The apparatus of claim 5, wherein said second bushing means further comprises a leaf spring between said shoulder screw and said surface portion.

7. The apparatus of claim 5, further comprising bracket angle means connected at an upper end to said screen monitor and at a lower end in rotatable, but tight-fit, relation, on said shaft such that said screen monitor is rotatably inclinable relative to said second bushing means.

8. The apparatus of claim 5, wherein an electrical connection cable extends interiorly through said column, said extension arm, and said first and second bushing means from said machine housing to said screen monitor.

* * * * *